US007752180B1

(12) United States Patent
Fair et al.

(10) Patent No.: US 7,752,180 B1
(45) Date of Patent: Jul. 6, 2010

(54) FILE SYSTEM GROUP CONSISTENCY POINT

(75) Inventors: Robert L. Fair, Cary, NC (US); Eric Hamilton, Durham, NC (US); Jeffrey S. Kimmel, Chapel Hill, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 589 days.

(21) Appl. No.: 11/637,608

(22) Filed: Dec. 12, 2006

(51) Int. Cl.
*G06F 17/00* (2006.01)
(52) U.S. Cl. .................. 707/690; 707/649; 707/661; 707/682
(58) Field of Classification Search .............. 707/200, 707/204, 202, 205, 649, 661, 682, 690; 717/161, 717/162, 112, 114, 202; 714/6; 709/223; 711/162, 165
See application file for complete search history.

(56) References Cited

U.S. PATENT DOCUMENTS

| | | | | |
|---|---|---|---|---|
| 5,218,695 A * | 6/1993 | Noveck et al. ............. | 707/205 |
| 5,568,629 A | 10/1996 | Gentry et al. | |
| 5,889,934 A | 3/1999 | Peterson | |
| 6,047,294 A * | 4/2000 | Deshayes et al. ........... | 707/204 |
| 6,490,598 B1 * | 12/2002 | Taylor ........................ | 707/204 |
| 6,732,124 B1 * | 5/2004 | Koseki et al. ............... | 707/202 |
| 6,748,504 B2 * | 6/2004 | Sawdon et al. ............. | 711/162 |
| 6,829,688 B2 * | 12/2004 | Grubbs et al. .............. | 711/162 |
| 7,103,619 B1 * | 9/2006 | Rajpurkar et al. .......... | 707/204 |
| 7,127,577 B2 | 10/2006 | Koning et al. | |
| 7,191,304 B1 * | 3/2007 | Cameron et al. ............ | 711/202 |
| 7,237,021 B2 | 6/2007 | Penny et al. | |
| 7,334,095 B1 * | 2/2008 | Fair et al. ................... | 711/161 |
| 7,433,903 B1 * | 10/2008 | Shapiro et al. ............. | 707/204 |
| 2004/0107226 A1 * | 6/2004 | Autrey et al. .............. | 707/204 |
| 2006/0106447 A1 * | 5/2006 | Opolski ..................... | 623/1.11 |
| 2007/0130213 A1 * | 6/2007 | Jean-Denis et al. ........ | 707/200 |
| 2007/0168633 A1 * | 7/2007 | English et al. ............. | 711/165 |
| 2008/0028009 A1 * | 1/2008 | Ngo ........................... | 707/204 |

OTHER PUBLICATIONS

Onno Zoeter et al., "Change Point Problems in Linear Dynamical Systems", ACM, Feb. 2005, pp. 1-20.*
Seung-Ho Lim et al., "Resource volume management for shared file system in SAN environment", Korea Advance Institute of Science and Technology, 2003, pp. 1-8.*

* cited by examiner

*Primary Examiner*—Thuy N Pardo
(74) *Attorney, Agent, or Firm*—Blakely, Sokoloff, Taylor & Zafman LLP

(57) ABSTRACT

A network storage filer implements a four-phase commit protocol to coordinate consistency points among a group of volumes (a "group consistency point") such that, upon recovery, all volumes of the group reflect consistency points taken at the same time. The filer records progress at each phase while creating the consistency points of the volumes. Upon recovery, the same or a different filer uses the last recorded progress indicator to ascertain whether the consistency points were completed on all of the volumes in the group. If all the volume consistency points of the group consistency point were completed, the filer users the volume consistency points to mount the volumes. Otherwise, the filer uses an earlier group consistency point to mount the volumes. In either ease, the volumes are consistent with each other.

21 Claims, 9 Drawing Sheets

Volume Superblock

FILE SYSTEM GROUP CONSISTENCY POINT

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to computer file storage systems and, more particularly, to systems for coordinating consistency points for a group of storage volumes.

In enterprise computing environments and other contexts, computer workstations, database servers, web servers and other application servers (collectively hereinafter referred to as "clients") frequently access data stored remotely from the clients, typically in one or more central locations. Computer networks typically connect the clients to mass storage devices (such as disks) that store the data. Such centralized storage (sometimes referred to as "network storage") facilitates sharing the data among many geographically distributed clients. Centralized storage also enables information systems (IS) departments to use highly reliable (sometimes redundant) computer equipment to store the data.

Specialized computers (commonly referred to as file servers, storage servers, storage appliances, etc., and collectively hereinafter referred to as "filers") located at the central locations make the data stored on the mass storage devices available to the clients. Software in the filers and other software in the clients communicate according to well-known protocols to make the data stored on the central storage devices appear to users and to application programs as though the data were stored locally on the clients.

The filers present logical "volumes" to the clients. From the perspective of a client, a volume appears to be a single disk drive. However, the volume can represent the storage space in a single storage device, a redundant array of independent disks (commonly referred to as a "RAID set"), an aggregation of some or all of the storage space in a set of storage devices or some other set of storage space. Each volume is logically divided into a number of individually addressable logical units such as files or blocks. The logical units are somewhat analogous to the blocks (sectors) of a disk, although, as discussed below, the logical units can be larger or smaller than disk blocks. For example, in a storage area network (SAN), a number of storage devices can be connected to one or more servers. A SAN permits a client or server to connect to storage devices on a network for block level I/O. A volume may be composed of a portion of available storage on a storage device, an entire storage device, portions of multiple storage devices, or multiple ones of storage devices. As another example, in a network attached storage (NAS) configuration, storage devices are addressed on a network for file-based access. A volume may be composed of a portion of available storage on a storage device, an entire storage device, portions of multiple storage devices or multiple ones of storage devices. The storage devices may be local or remote, and operated with file-based protocols such as NFS or CIFS, meaning connectivity through a "cloud" of a network connection.

The clients issue input/output (I/O) commands that entail blocks of the volumes, and the filers receive and process these I/O commands. In response to the I/O commands from the clients, the filers issue I/O commands to the appropriate mass storage device(s) to read or write data on behalf of the clients.

In addition, the filers can perform services that are not visible to the clients. For example, a filer can "mirror" the contents of a volume on one or more other volumes. If one "side" of the mirror fails, the filer can continue I/O operations on a remaining mirror side(s), without impacting the clients.

Volumes store files, such as data files, scripts, word processing documents, executable programs and the like. Each file occupies an integral number of blocks ("data blocks") of a volume. The volume also stores metadata that describes the files stored on the volume. In the context of this disclosure, the term "metadata" means information about which blocks of a volume are allocated to files, which blocks are unallocated (i.e., free), where each block or segment of each file is stored on a volume, directory information about each file, such as its name, owner, access rights by various categories of users, etc., as well as information about the volume, such as the volume's name and size and access rights by various categories of users.

A volume's metadata is typically stored on the volume in specially designated files and/or in specially designated locations, as is well known in the art. A filer maintains the metadata for each volume, i.e., the filer updates the metadata as the filer creates, extends, deletes, etc. files on the volume. All the files on a volume (including the files that store metadata) and any metadata stored on the volume in locations other than files are collectively referred to as a "file system."

For performance reasons, a filer typically caches at least a portion of a volume's file system in memory. As clients access the volume, the filer typically caches changes to the file system (i.e., changes to data blocks and other metadata), without immediately writing these changes to the mass storage device(s) that implement the volume. Periodically (such as every 10 second) or occasionally (such as if the cache fills to a predetermined fraction of its capacity), the filer flushes the cache, i.e., the filer writes these changes to unallocated (i.e., free) space on the mass storage device(s) that implement the volume.

Each point in time at which the filer flushes the cache is known as a "consistency point." A consistency point leaves the volume in a self-consistent state, i.e., the metadata on the disk(s) completely and accurately describes the current state of the data blocks, free space, etc. of the volume. The cache flush produces an on-disk image of the volume metadata, which may be implemented as a set for disk blocks configured to store information, such as data. Thus, the on-disk image changes with every consistency point (such as every ten seconds); however, the on-disk image does not change between consistency points. Thus, the on-disk image advances in discrete steps, and a consistency point represents the state of the volume at the time of the consistency point.

A consistency point is an atomic operation, i.e., a consistency point completes either successfully or not at all. The last step in creating a consistency point involves overwriting an on-disk data structure (commonly known as a "superblock") that includes a "root" of the file system. All file operations logically begin by accessing the root of the file system. The root is part of an on-disk file system, which is a set of disk blocks configured to store logically organized information, such as data, with some of the information being used to determine how other stored information is organized. The root is part of the information that contributes to determining how other stored information is organized. With discrete consistency points completed by overwriting the superblock, a self-consistent state for the volume also advances in discrete steps. Thus, until the superblock is overwritten, any attempt to bring the volume on line ("mount the volume") will access the on-disk file system represented by the previous consistency point. After the superblock is overwritten, the consistency point is considered complete, and any attempt to access files or to mount the volume will access the on-disk file system represented by the just-completed consistency point. Each consistency point is time stamped, or some other mechanism (such as a monotonically increasing "generation number") is used to identify each consistency point.

Consistency points enable filers to quickly resume operations after a system failure ("crash"). Because a consistency point represents a self-consistent file system, the filer need not perform a lengthy consistency check or cleanup procedure on each volume before mounting the volume, even after a crash. While recovering from a crash, the filer simply accesses the consistency point represented by the on-disk superblock on each volume to mount the volume.

Mounting this consistency point quickly restores access to the data on the volume, as of the time of the last consistency point. Only a small number of write and modify I/O requests, i.e., requests that were issued by clients after the most recent consistency point, are lost.

Some filers also maintain transaction logs of write and modify I/O requests received by the filers between consistency points. These transaction logs are stored in nonvolatile (such as battery-backed up) memories. When such a filer restarts after a system crash, the filer mounts its volumes, and then the filer "replays" the transactions in the log to bring the volumes' contents up to date, as of the most recent transaction log entry, before permitting clients to access the volumes.

Although consistency points and transaction logs facilitate quick recovery of individual volumes after a filer crash, the recovery may sometimes be inadequate. For example, volumes or filer components may be spread over a relatively wide geographic area, such as may be useful for applications located in a metropolitan area. Filer components, including volumes, may be connected over a high-speed link such as a fiber optic cable. In unusual situations such as those related to disaster recovery, the transaction log consistency across volumes at different sites cannot be guaranteed. For example, an event such as fire or explosion may cause a data disaster, such as may happen if a fiber optic cable is cut or a transaction log malfunctions. In these disaster recovery situations, one or more transaction logs corresponding to data volumes may not have up to date data. A volume transaction log may also simply malfunction on its own, so that one or more volumes may not have consistent data related to other volumes in a multiple volume set. Some applications that require consistency among multiple volumes may experience problems in such a situation.

For example, a database application typically stores data on one or more volumes and a transaction log on another volume. (The database transaction log is distinct from the filer transaction log described above.) If a connection is severed or a filer crashes during a consistency point involving these volumes, the filer may successfully complete its cache flush operation on some, but not all, of the volumes. In this case, some of the consistency points are completed and others of the consistency points are not completed. Thus, some of the on-disk images contain data and metadata from one point in time, while other of the on-disk images contain data and metadata from a different point in time.

Volumes with on-disk images that are inconsistent with on-disk images on other volumes pose problems. As noted, when the filer restarts, the filer restores the consistency point of each volume. However, during recovery, data on some of the volumes (the volumes on which the filer completed taking consistency points before the link was severed or the filer crashed) reflect file systems as they existed at a particular time, but data on other of the volume (the volumes on which the consistency points were not completed before the link was severed or the filer crashed) reflect file systems as they existed at a different time, such as ten seconds earlier. From the perspective of a database application, the volumes are inconsistent with each other, and the database application must perform a lengthy reconciliation process.

During reconciliation, the database may not be accessible by users or other clients. Even if the database is accessible, the reconciliation process consumes valuable computer resources and generates a large number of I/O requests to the affected volumes. This extra I/O traffic slows access to the volumes by other clients, even if the other clients are accessing files other than the database files.

BRIEF SUMMARY OF THE INVENTION

Disclosed herein is a method and system for coordinating consistency points among a group of volumes. The method and system define a protocol for coordinating consistency points among the group of volumes, such that, upon recovery, all the volumes of the group reflect consistency points taken at the same time as each other. This is referred to as a "group consistency point." The protocol defines a four-phase commit mechanism that records progress at each phase while the consistency points of the volumes are being taken. The term commit refers to the action of on-disk synchronous recording of a volume superblock, implemented as a data structure, in addition to recording a progress indicator. The progress indicator may be implemented as an identifier that indicates or identifies the current or most recently completed phase of the protocol. A superblock is recorded completely in a given volume before another superblock of that volume is recorded. Synchronous recording refers to the notion of completing the recordation of one superblock of a given volume, before beginning recordation of another superblock of the volume. Upon recovery, a filer can ascertain whether all of the volume consistency points of the group of volumes were completed. The filer uses an indication of the last recorded progress, such as the progress indicator, to ascertain whether the consistency points were completed on all or fewer than all of the volumes in the group. The protocol defines a location for storing information about the current phase of a group consistency point. This information is available, regardless of the state of the volumes.

A group of volumes is organized with a root volume that acts as an administrative and control volume for the group. The root volume typically stores filer software, filer data and settings, for example. The root volume includes root superblocks located in persistent memory locations. The root superblocks store metadata, among other things, which contains information related to the root volume and other volumes in the volume group. A progress indicator for the four-phase commit mechanism is stored within the superblocks of the root and other volumes. The value of the progress indicator can vary between superblocks, depending upon the state or phase of progress through the protocol. The progress indicator acts as a sequence indicator, which indicates continuing progress through the phases of the protocol. The sequence indicator thus operates to indicate the sequence of phases of writing the superblocks to the root and other volumes.

The protocol enables a filer to ascertain if consistency points of all the volumes of the group were completed during a group consistency point. If all the volume consistency points of the group consistency point were completed, the filer uses the volume consistency points to mount the volumes. However, if not all the volume consistency points were completed, the filer uses an earlier (complete) group consistency point to mount the volumes. In either case, the volumes are consistent with each other. If sufficient information is not available to ascertain whether the volumes can be mounted such that they are consistent with each other, an appropriate error message is issued.

According to an exemplary embodiment, in accordance with the present disclosure there is provided a method for restoring a file system that has a plurality of volumes with a plurality of data structures associated with each volume. The method establishes a sequence for writing the data structures to the respective volumes and then determines where the sequence was interrupted in the event of a system failure. The method then uses the progress indicator as a sequence indicator to determine the sequence state or progression through the phases of the protocol to contribute to restoring the volumes to a consistent state. Depending on where the sequence was interrupted, a data structure for each volume is chosen to restore the volume when the volume is mounted after the system failure.

According to an aspect of the disclosed method, the data structures have an identifier that uniquely identifies them in each volume. In addition, or alternately, the data structures each include a sequence indicator that indicates a point in a sequence for writing data structures associated with respective volumes. In one embodiment, a root volume is used to establish the sequence. By reading information in the data structures, or superblocks, of the root volume, the method can determine where in the sequence the system failure or interruption occurred. The sequence may be established by alternately writing superblocks on the root volume and one or more other volumes.

According to another exemplary embodiment, a method for restoring a file system that has a plurality of volumes with a plurality of superblocks on each volume is disclosed. The method sequentially writes a data structure to a root volume, a data structure to a data volume, another data structure to the root volume and another data structure to the data volume. The written data structures may take the form of on-disk images that include information about the sequential data structure writing process. The method determines where in the writing sequence the system was interrupted, through failure, power outages, etc., and restores the volumes using the information about the sequential data structure writing. The data structure for restoring the root volume is selected based on the writing sequence information, as are data structures for restoring the data volumes.

According to an aspect of the disclosed method, a policy indicates which data structure to use after the sequence state is determined. The policy contributes to obtaining a consistent set of data structure for the volumes.

According to another exemplary embodiment, there is disclosed a method for obtaining a consistent set of data structures for mounting a plurality of volumes. The method calls for examining data structures in a first volume to determine where an interruption occurred in a sequence of writing the data structures to respective volumes. A policy for recovering from an interruption is developed based on the determination of where the interruption occurred in the sequence of writing the data structures. The policy is applied to identify a data structure for each volume for mounting the volume, based on the determined point in the data structure writing sequence. The system mounts the volumes with the identified data structures in a restoration process.

According to an aspect of the disclosed method, the system issues a warning if there is too little information to completely identify a data structure for each volume to obtain a consistent set of data structures across the volumes.

According to another exemplary embodiment, there is disclosed a system for restoring a file system that has a plurality of volumes using at least one data structure associated with each volume. A sequence of data structure writes provides a mechanism for determining where interruptions in system operations occur due to system failures or power outages, for example. The system determines the point at which the data structure writing sequence was interrupted, and selects a policy to apply to obtain a consistent set of volumes based on the determined point in the writing sequence. The policy contributes to selecting a data structure for each volume to be used to restore the volume upon restoration of the file system after the interruption.

According to an aspect of the system, each data structure includes an identifier that is unique for each data structure of a given volume. In addition, each data structure includes a sequence identifier. In one embodiment, the data structures of a root volume are examined to determine an interruption point in the progression of writing the data structures. According to another aspect, the data structure writing sequence is formed by alternately writing data structures on the root volume and one or more other volumes.

These and other features, advantages, aspects and embodiments of the present invention will become more apparent to those skilled in the art from the Detailed Description of the Invention that follows in conjunction with the Drawings.

DETAILED DESCRIPTION OF THE INVENTION

Figure 1:
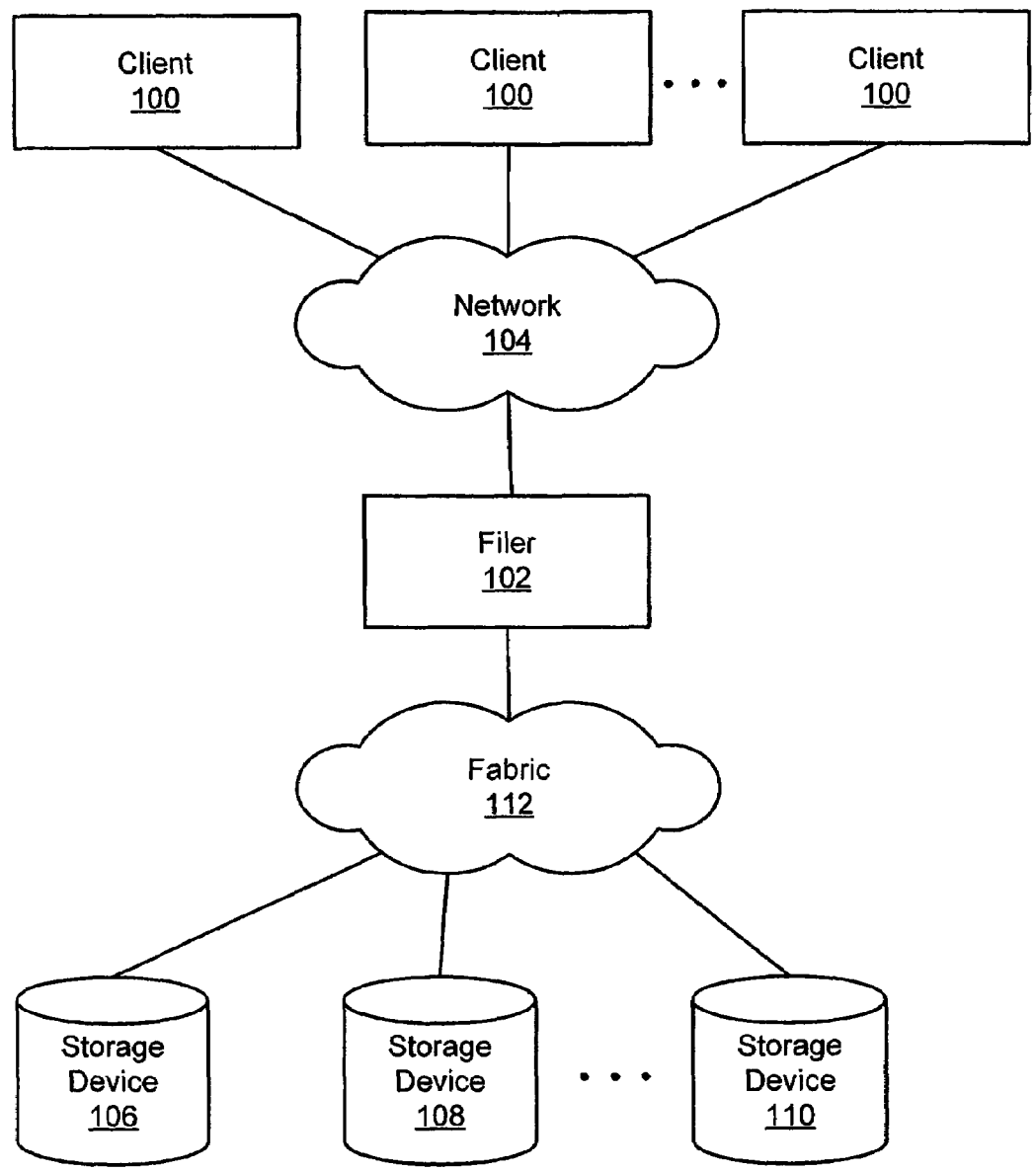
FIG. 1 is a block diagram of a prior art network file storage system.

In accordance with the present invention, a method and apparatus are disclosed for coordinating consistency points among a group of volumes. As noted, workstations and other clients are frequently connected to filers via local or wide area networks (LANs or WANs). FIG. 1 is a block diagram of an exemplary network storage system, in which the presently disclosed group consistency point system can be used. Such a network storage system is available from Network Appliance, Inc., Sunnyvale, Calif. Clients 100 are connected to a filer 102 via a network 104, such as a packet-switched network. The filer 102 is connected to mass storage devices 106, 108 and 110 via a fabric 112, such as a fiber distributed data interface (FDDI) network. Other numbers of filers and storage devices and other network technologies can be used. The group consistency point system is implemented in the filer 102, such as by a processor executing instructions stored in a memory (not shown) in the filer. In other aspects, the components shown in FIG. 1 are conventional.

By way of background, the filer 102 makes some or all of the storage space on the storage devices 106-110 available to the clients 100 in a well-known manner. Each of the storage devices 106-110 can be an individual disk, several disks, a RAID set or some other mass storage device(s). The filer 102 presents each storage device 106-110 or a group of the storage devices 106-110 as a volume to the clients 100. Each volume consists of a set of consecutively addressed blocks. In some cases, each block is the same size as the smallest addressable unit, such as a disk sector, on the storage devices 106-110. In other cases, each block represents more or less than a whole number of (at least logically) contiguous addressable units on the storage devices 106-110. For example, in filers available from Network Appliance, Inc. of Sunnyvale, Calif., each block contains 4,096 bytes (4 KB).

Figure 2:
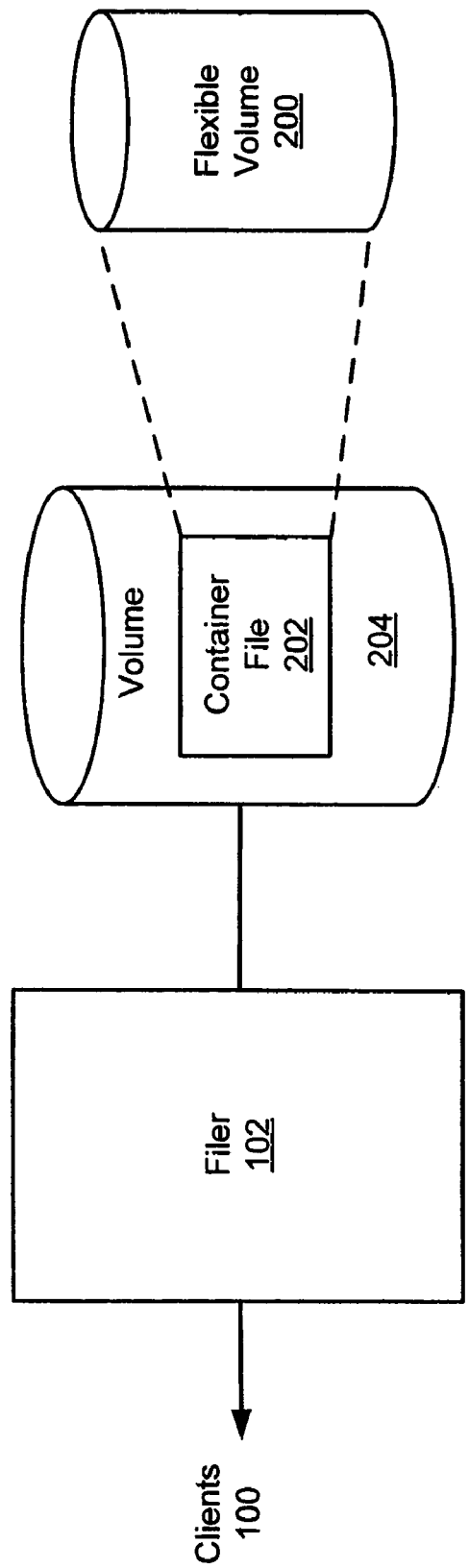
FIG. 2 is a block diagram of a prior art flexible volume.

A volume can also represent a portion of the storage space in one or a group of storage devices. Such a volume is commonly referred to as a "flexible volume." As shown in FIG. 2, a flexible volume 200 is implemented as a file (known as a "container file" 202) stored on another volume 204, i.e., on one or a group of storage devices. Unlike traditional volumes (described above), a flexible volume can expand as needed by extending the underlying container file. Systems that provide flexible volume functionality are available from Network Appliance Inc., Sunnyvale, Calif. under the trade name Flex-Vol. For purposes of the present disclosure, the term "volume" includes traditional volumes and flexible volumes.

Metadata and File Systems

Figure 3:
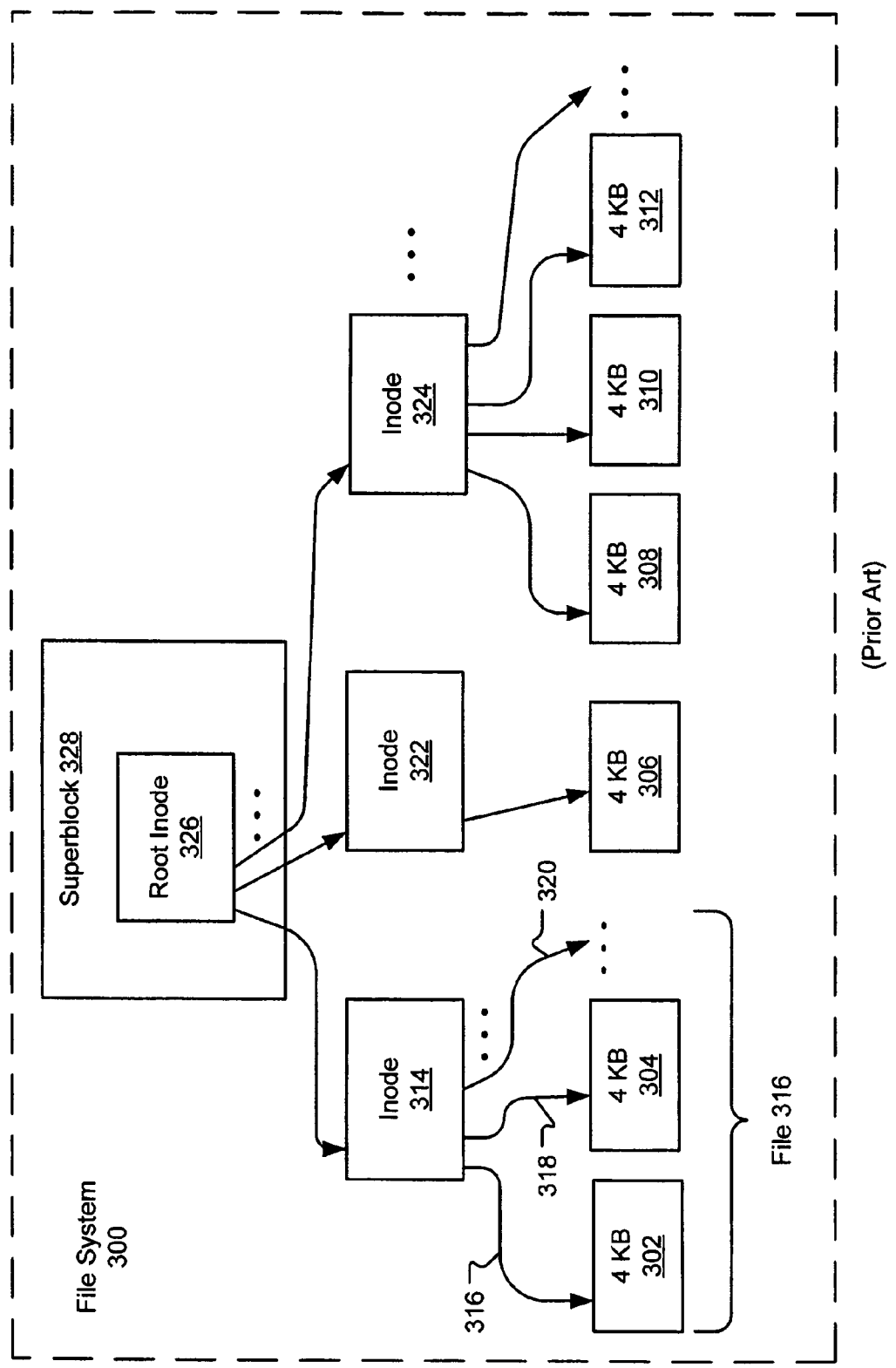
FIG. 3 is a block diagram of a prior art file system.

As noted, a volume stores data and metadata, which are collectively referred to as a file system. FIG. 3 is a block diagram of an exemplary file system 300. Blocks 302-312 of 4,096 bytes (4 KB) each are allocated to store files or portions of files. A data structure, commonly referred to as an "index node" ("inode"), is allocated for each file to store metadata that describes the file. For example, inode 314 contains data that describes a file 316 that occupies blocks 302, 304, etc. The inode 314 contains pointers 316, 318, 320, etc. to the respective blocks 302, 304, etc. of the file 316. These pointers 316-320, etc. facilitate accessing the blocks 302, 304, etc. of the file 316, as is well known in the art. Other inodes 322 and 324 similarly describe other files.

A "root inode" 326 contains pointers to the individual inodes 314, 322, 324, etc. The root inode 326 and volume information, such as the volume's name, size and consistency point information, are stored in a data structure commonly known as a "superblock" 328.

Figure 4:
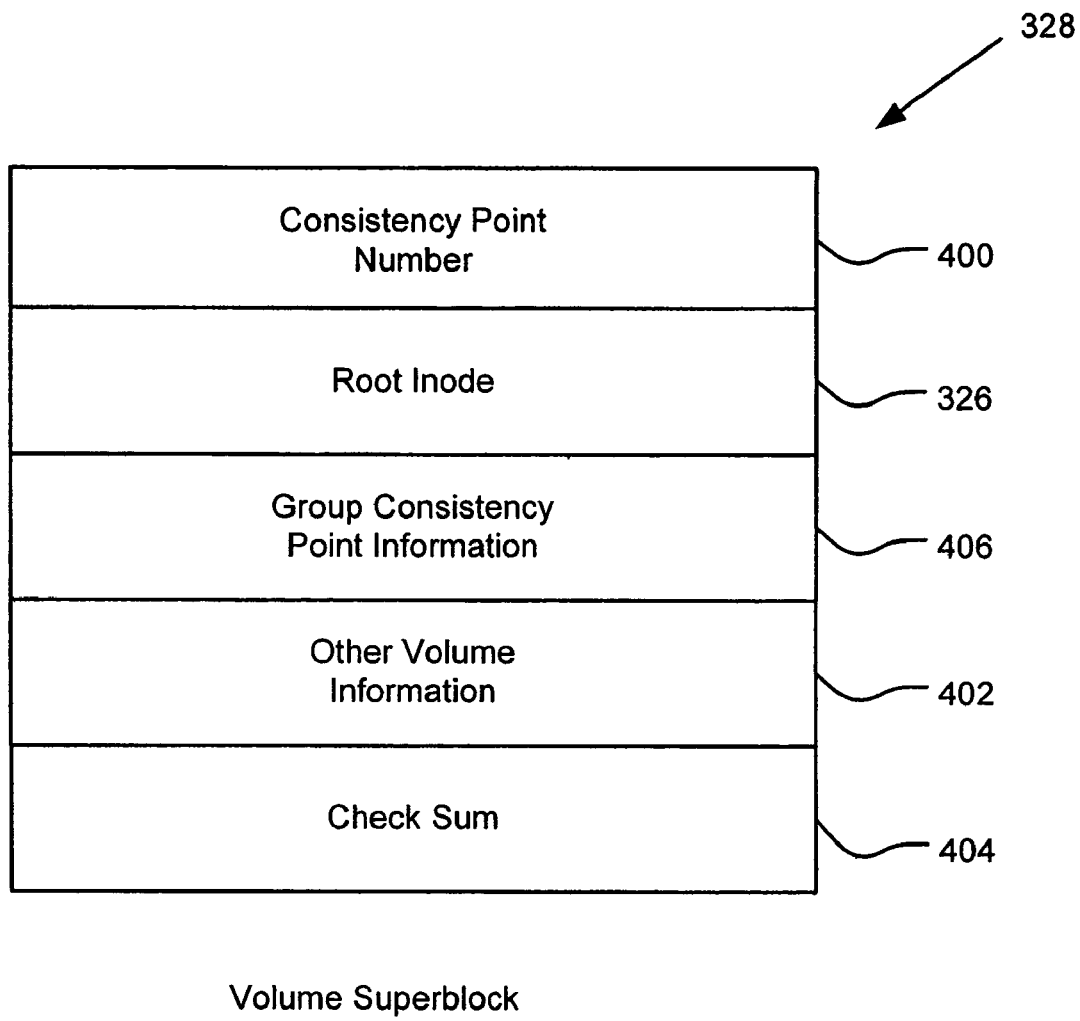
FIG. 4 is a block diagram of a volume superblock in accordance with an embodiment of the present invention.

FIG. 4 is a block diagram of exemplary fields in the superblock 328. For example, information about the most recent consistency point is stored in a "Consistency Point Number" field 400, as described in more detail below. Volume information, such as the volume's name and size, are stored in an "Other Volume Information" field 402. The contents of a "Checksum" field 404 can be used to check whether the superblock 328 is corrupt.

The contents of the superblock 328 are critical; if a filer cannot read a volume's superblock, the filer cannot mount the volume. Therefore, for robustness, two copies (not shown) of the superblock 328 are stored on the volume. If one copy of the superblock 328 is corrupt, a filer can use the other copy of the superblock 328 to mount the volume. The two copies of the superblock 328 are stored at predetermined locations on the volume (typically in the first two blocks of the volume), so the filer can locate the two copies of the superblock without accessing other information on the volume.

Figure 5:
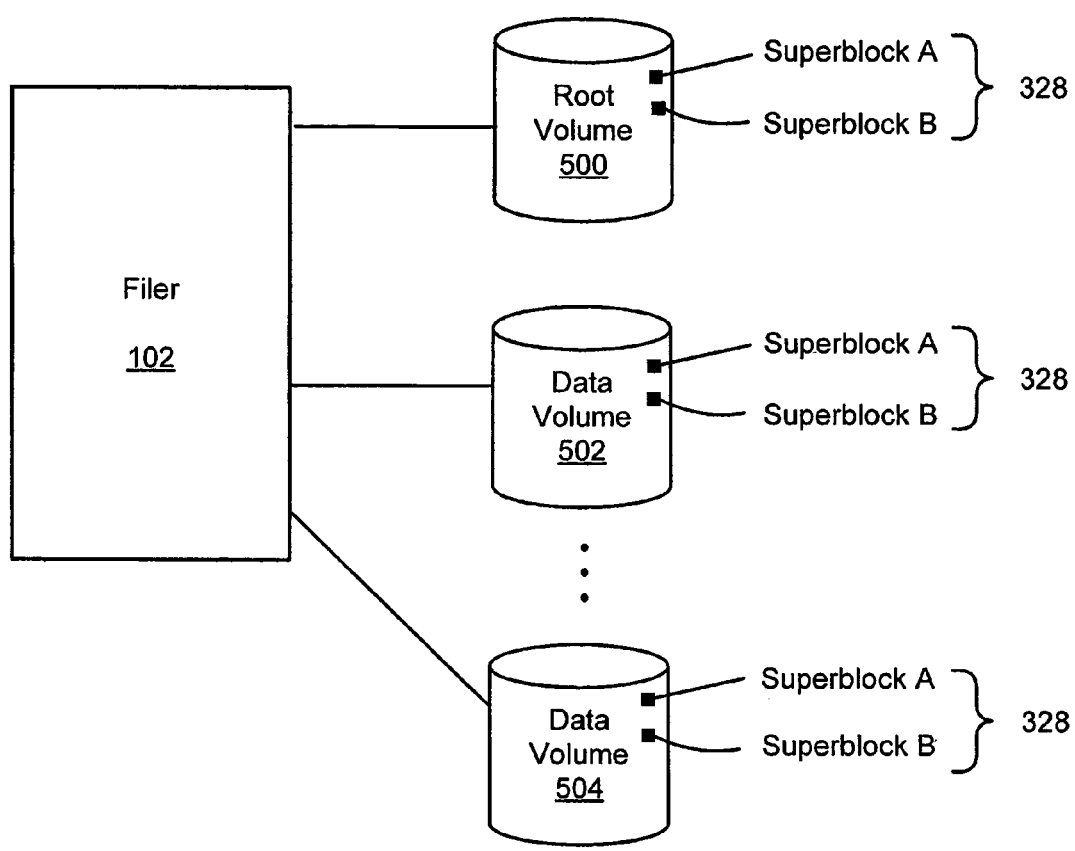
FIG. 5 is a block diagram of a network file storage system that includes the superblock of FIG. 4.

As shown in FIG. 5, the two copies of the superblock 328 are referred to as "Superblock A" and "Superblock B," however which superblock (A or B) is stored in the first block of the volume and which superblock is stored in the second block of the volume is not predetermined. That is, the two copies of the superblock 328 are not necessarily stored in "alphabetical order." Which superblock (A or B) is stored in the first block of the volume and which superblock is stored in the second block are determined when the volume is mounted, as described below.

Every time a filer creates a consistency point on the volume, the filer writes to both copies of the superblock 328; however, the filer writes to only one of the superblock copies at a time. The filer writes to Superblock A first, then the filer writes to Superblock B. The filer waits until the first superblock write operation completes before beginning to write to the second superblock. This delay reduces the likelihood that both superblock copies will be corrupted, as might happen if, for example, the filer were to crash while writing to both superblocks at the same time.

When a filer attempts to mount a volume, if one of the two copies of the superblock (A or B) is found to be corrupt, the filer designates the corrupt superblock as A. The filer then uses the other (uncorrupted) copy of the superblock (designated as Superblock B) to mount the volume, and the filer overwrites the corrupt superblock (A) with a copy of the uncorrupted superblock (B). Subsequently (for the current mount of the volume), during each consistency point, the filer writes to the previously corrupted superblock copy (Superblock A) first, then the filer writes to the other superblock copy (Superblock B). Thus, depending on which superblock was corrupt when the volume was mounted, Superblock A might be stored in the first block of the volume or in the second block of the volume.

As noted, each consistency point includes an indication of when it was made or the relative order in which the consistency point was made. The indication is provided as a sequence indicator. The superblock data structure 328 includes a Consistency Point Number field 400 (FIG. 4), and the filer writes a monotonically increasing generation number in the Consistency Point Number field 400 each time the filer creates a consistency point. Alternatively, other schemes, such as time stamps, can be used. The indication in the consistency point provided by Consistency Point Number field 400 acts as a progress or sequence indicator to show the state of the four-phase commit protocol. As the generation number changes in the various superblocks, the state of the superblock write sequence can be determined. The progress or sequence indicator may thus be used to determine a consistency point to use for mounting a volume.

When mounting a volume, such as when recovering from a crash, the filer compares the two superblock copies (A and B). More specifically, the filer compares the Consistency Point Number fields 400 and ascertains whether both of the two superblocks were written as part of one consistency point or, alternatively, the two superblocks were written during two different consistency points. In the latter case, the filer ascertains which of the two superblocks was written during the most recent consistency point, and which of the two superblocks was written during the preceding consistency point.

Returning to FIG. 3, an inode (such as inode 314, 322, or 324) typically contains room for a fixed number of pointers (such as pointers 316, 318, 320, etc.). If a file occupies more data blocks than the number of pointers in the inode can point to, each inode pointer points to an "indirect block" (not shown), instead of pointing to a data block of the file, and each indirect block contains pointers to the data blocks of the file. For a yet larger file, two or more levels of indirect blocks are used. For a very small file, rather than allocating data blocks (such as blocks 302, 304, etc.) to store the file's contents, the file's contents are stored in the inode, where the inode would otherwise store pointers (such as pointers 316, 318, 320, etc.) Other well-known file system and metadata schemes can also be used.

As noted, a filer can locate any file or portion thereof (such as to read or write the file or portion) by following pointers from the root mode 326, through the appropriate mode 314, 322, or 324, etc., through one or more levels of indirect block(s) (if needed; not shown), to the appropriate content block(s) 302-312, etc. In any case, the filer always (at least logically) begins at the root mode 326. Thus, the filer frequently accesses the root mode 326 and other metadata related to frequently accessed files.

For performance reasons, many filers cache some or all of this metadata, as well as some of the data blocks. When a filer mounts a volume, the filer reads the volume's superblocks 328, including the root mode 326, and the filer stores a copy of the root mode 326 in its cache. Also when the filer mounts the volume, or later as clients access files on the volume, the filer caches other metadata, such as the modes 314, 322, 324, etc. of frequently accessed files, indirect blocks (not shown) and, optionally, the most frequently accessed ones of the content blocks 302-312, etc.

As clients modify, create, delete, extend, etc. the files on the volume, the filer modifies the cached data and metadata to reflect changes in the data blocks, the amount of free and allocated space on the volume, which blocks are allocated to the files on the volume, etc. In other words, the filer caches changes to the file system, without writing these changes to the underlying storage device(s). Periodically and/or occasionally, the filer writes modified cached data and metadata to the volume, i.e. the filer "flushes" the cache to the underlying mass storage device(s). The cache is also flushed when the filer dismounts the volume.

Figure 6:
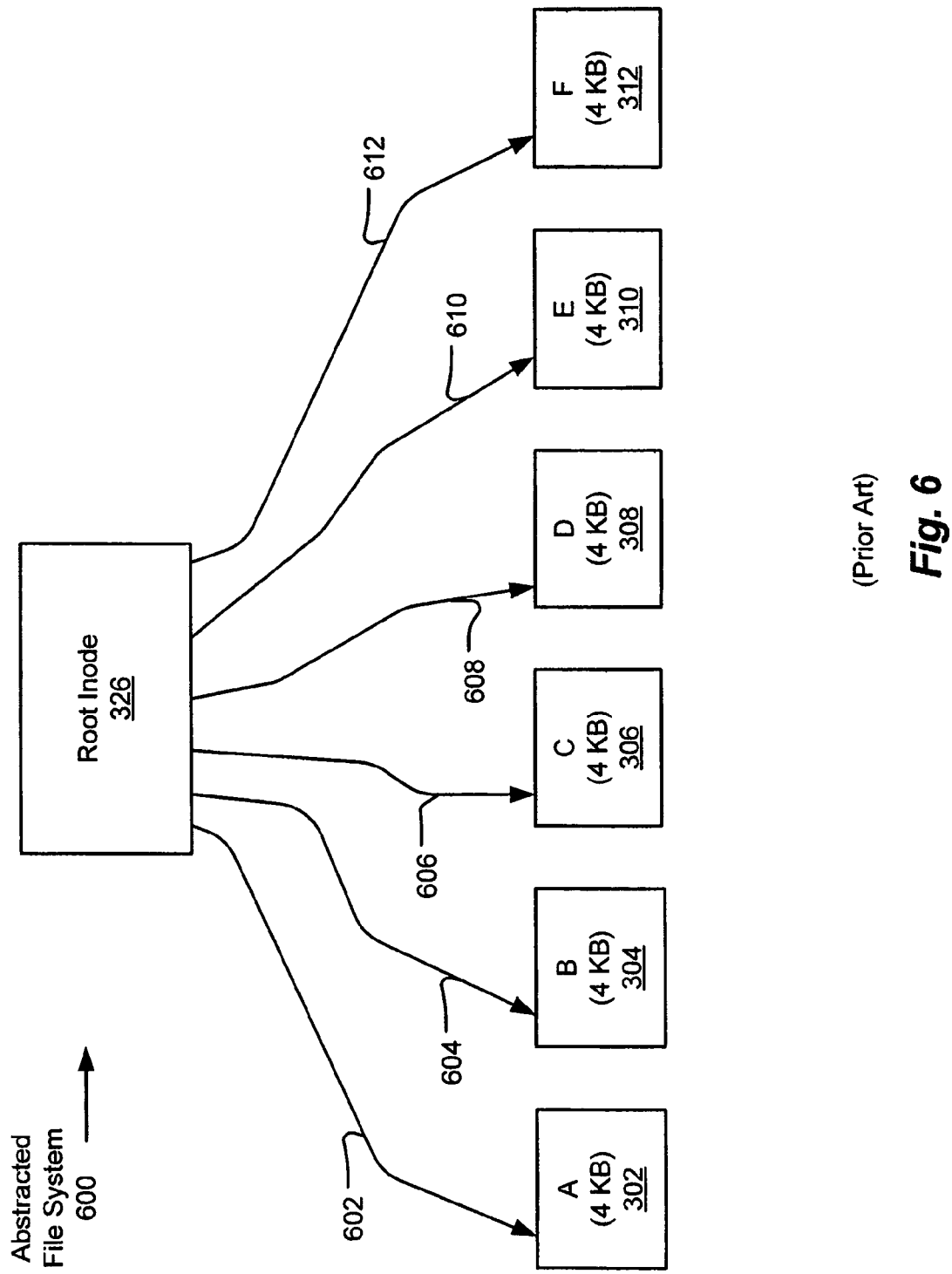
FIG. 6 is an abstracted block diagram of the prior art file system of FIG. 3.

The file system 300 of FIG. 3 is shown in abstracted form 600 in FIG. 6. In FIG. 6, the root inode 326 is shown pointing (via pointers 602, 604, 606, 608, 610 and 612) to data blocks 302-312. For simplicity, the inodes 314, 322 and 324 and other details shown in FIG. 3 are omitted from FIG. 6.

As noted, when a filer restarts after a system crash, the filer accesses the most recent consistency point on each volume to mount the volume. Only a small number of write and modify I/O requests, i.e., requests that were issued by clients after the most recent consistency point, are lost. However, as noted, a transaction log stored in nonvolatile memory enables the filer to "replay" transactions in the log and to bring the volume contents up to date, as of the most recent transaction log entry.

Although consistency points and transaction logs facilitate quick recovery of individual volumes after a filer crash, the recovery is inadequate for applications that require consistency among multiple volumes. If a filer crashes while taking consistency points of multiple volumes, consistency points on some of the volumes may be completed and consistency points on other of the volumes may not be completed. For example, if the filer crashes while writing to one of the superblocks on a volume, the write operation may not complete, and the superblock may become corrupt as a result of the partially completed write operation. As noted, if a superblock is not readable, the consistency point represented by the superblock is not available for mounting. Thus, after recovery, data and metadata on one of the volumes may reflect a consistency point taken at a particular time, but data and metadata on another of the volumes may reflect a consistency point taken at a different time, such as ten seconds earlier. In such a case, the volumes are inconsistent with each other.

Four-Phase Commit Protocol

To coordinate consistency points among a group of volumes, the presently disclosed method and apparatus employ a four-phase commit mechanism when recording a group consistency point. The four-phase commit mechanism records state information at the beginning or end of each phase of each consistency point. If the filer crashes during a consistency point, the last recorded phase entry indicates how much of the group consistency point the filer was able to complete, i.e. how much progress had been made toward writing the consistency points in a sequential order on the volumes before the system crashed. Upon recovery, a filer (usually the filer that crashed, but alternatively another filer) uses the last recorded phase entry to ascertain how much progress had been made toward writing the consistency points in a sequential order on the volumes and, consequently, whether all of the individual volume consistency points were completed. If all the volume consistency points were completed, the filer uses the consistency points to mount the volumes. However, if not all the consistency points were completed, the filer uses an earlier (complete) group consistency point to mount the volumes. In this case, the most recent consistency point on some of the volumes may be ignored, and an earlier consistency point is used. In either case, a set of consistency points are identified, so that use of the set of consistency points to mount the volumes has the result that the mounted volumes are consistent with each other.

The phase entry, or superblock writing sequence progress information, is stored in a persistent memory that is independent of the state of the volumes involved in the group consistency point. The progress information is a recorded indicator, such as a sequence indicator, that can be used to determine a point at which the superblock writing sequence was interrupted. In one embodiment, the progress information is stored in a root volume associated with the filer. The root volume typically stores filer software, filer data and other data relating to the files. The progress information is preferably stored in the superblocks of the root volume. Other persistent memory locations that may be used include those on a root volume, data volume, other volumes that are independent of the volumes involved in the group consistency point or locations on other filers or other network elements.

During recovery from a crash, the filer uses information in the persistent memory to determine during which phase of a group consistency point the crash occurred or if the crash occurred while the filer was not performing a consistency point. From this determination the filer determines a "policy," according to which the filer will treat individual volumes, i.e., how the filer will, use the superblocks on the individual volumes to mount the volumes. Thus, recovery involves two steps: (1) determine a policy and (2) apply the policy to each volume.

In one embodiment, a location on a root volume (described in more detail below) is used as the persistent memory for storing state information during the four-phase commit process. As noted, which prior-art superblock (A or B) is stored in the first block and which superblock (A or B) is stored in the second block are not specified. This lack of specificity makes it difficult for a filer to ascertain which superblock on a volume is Superblock A and which superblock on the volume is Superblock B.

In accordance with the present disclosure, a field is added to each superblock 328 to identify the superblock as either A or B, i.e., to identify which superblock copy was written first in time and which one was written second. The added field is a "Group Consistency Point Information" field 406 (FIG. 4), which, among other things, identifies the superblock 328 as being either Superblock A or Superblock B. The group consistency point information field 406 is added to at least the root volume and all volumes involved in group consistency points. Possible values stored in the group consistency point information field 406 are shown in Table 1.

TABLE 1

| Group Consistency Point Information | Meaning |
| --- | --- |
| 0 | No policy |
| 1 | This superblock is Superblock A |
| 2 | This superblock is Superblock B |

A value of 0 (zero) in the group consistency point information field 406 indicates that neither superblock A nor superblock B is identified. A zero value in this field is recognized by the presently disclosed system for backward compatibility. That is, a zero value in this field indicates that the volume was most recently dismounted (or a consistency point was written) by a filer that does not include (or was not using) the disclosed system.

A value of 1 (one) in the group consistency point information field 406 indicates that this superblock 328 is Superblock A. A value of 2 (two) in this field indicates that this superblock is Superblock B. Of course, the actual values used in this field are matters of design choice. Oter numeric, alphabetic, alphanumeric or other values are possible, as long as an association is defined between one value and Superblock A and between a different value and Superblock B. Similarly, flags or other types of indicators can be used instead of values. Because there are more than one superblock for each volume, the superblocks, or consistency points, can be viewed as forming sets that may be used to form a group consistency point. That is, a set of consistency points can be formed that are consistent with each other, and can be used as a group consistency point.

As noted, taking a group consistency point involves flushing a filer's cache, including writing the two superblock copies, to each volume of the group of volumes. The four-phase commit protocol is summarized in Table 2. The actions listed in Table 2 are taken after the filer's cache has been flushed, excluding updating the two superblocks. Thus, all the filer's modified cache information is written to the volumes before any of the actions listed in Table 2 is taken. (The actions listed in Table 2 are described in more detail below.)

TABLE 2

| Phase | Action |
| --- | --- |
| 1 | Synchronously write Superblock A on the root volume |
| 2 | Write Superblocks A on all volumes of the group |
| 3 | Synchronously write Superblock B on the root volume |
| 4 | Write Superblocks B on all volumes of the group |

After the four-phase protocol has been performed, i.e., after both superblocks have been written to on all the volumes of the group of volumes, the group consistency point is considered complete.

Figure 7:
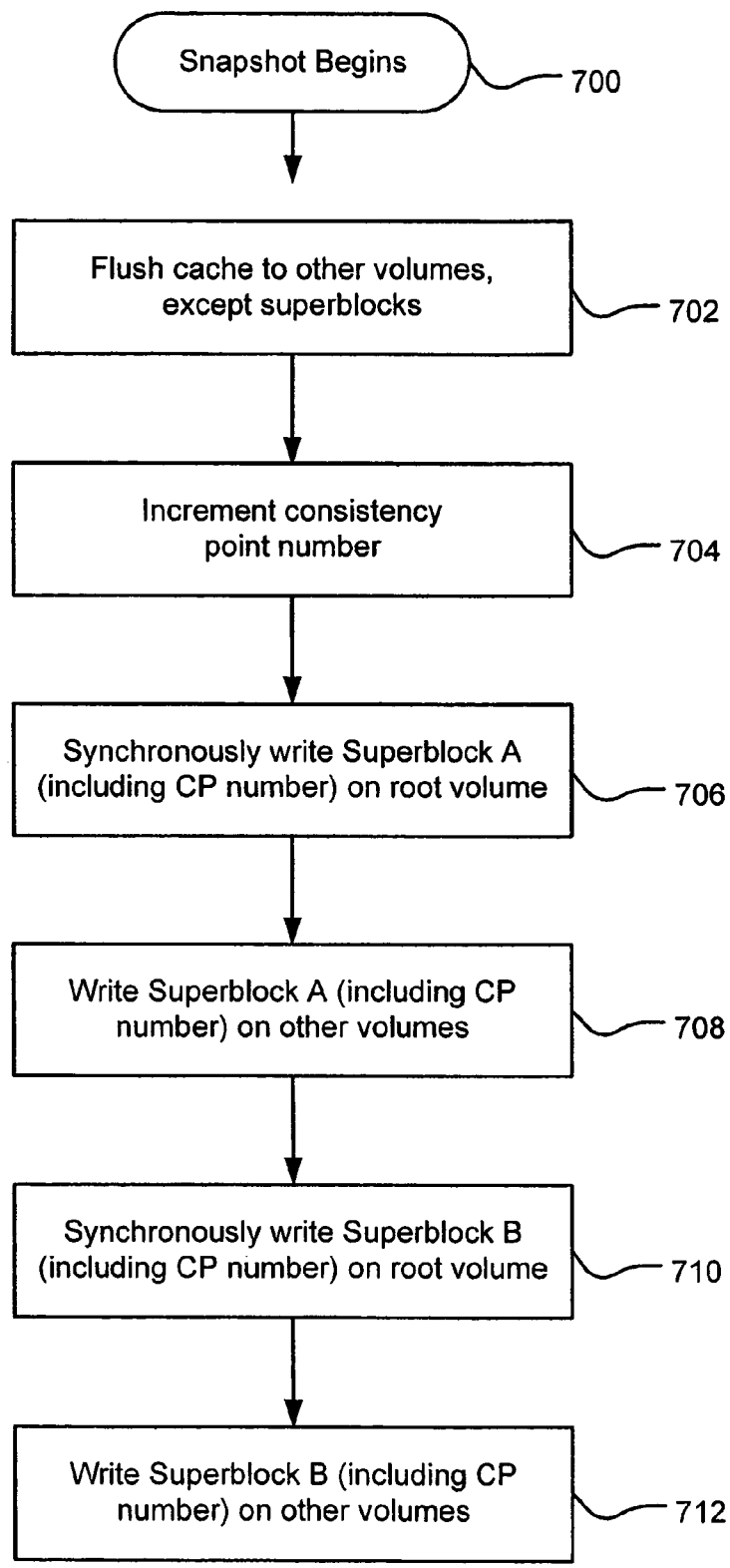
FIG. 7 is a flowchart illustrating operation of a four-phase protocol, in accordance with an embodiment of the present invention.

FIG. 5 is a block diagram of an exemplary network storage system in which a filer 102 controls a root volume 500 and two or more (data) volumes 502 to 504. The four-phase protocol will be explained with reference to FIG. 5 and a flowchart in FIG. 7. Creating a consistency point begins at 700 (FIG. 7). At 702, for the volumes 502-504, the filer 102 allocates space on the volumes and flushes the cache, including data blocks and metadata, but not the superblocks. At 704, the filer 102 increments the Consistency Point Number.

According to the four-phase commit protocol (Table 2), during phase 1, Superblock A is synchronously written on the root volume 500, as indicated at 706. "Synchronously writing Superblock A" means writing Superblock A on the root volume 500 does not begin until all previous actions (i.e., previous phases or flushing the filer's cache) have been completed, and subsequent actions (i.e., next phases, such as writing Superblocks A on all volumes 502-504 of the group of volumes) do not begin until the writing of Superblock A on the root volume 500 has been completed.

Once the filer 102 completes writing Superblock A on the root volume 500, in phase 2 the filer 102 writes Superblocks A on all the volumes 502-504 of the group, as indicated at 708. These write operations can, but need not, occur in parallel.

Once all the Superblocks A on all volumes 502-504 of the group have been written, in phase 3 the filer 102 synchronously writes Superblock B on the root volume 500, as indicated at 710.

Once the filer 102 completes writing Superblock B on the root volume 500, in phase 4 the filer 102 writes Superblocks B on all volumes 502-504 of the group, as indicated at 712. These write operations can, but need not, occur in parallel.

Crash Recovery/Volume Mounting

As noted, each superblock (A and B) includes a Consistency Point Number field 400. Thus, when mounting a volume 502-504, the filer 102 can ascertain whether the superblock on the volume 500-504 is associated with the most recent consistency point or a previous consistency point. Consequently, later, such as during a recovery from a crash, if Superblock A on the root volume 500 is found to have been written as part of the most recent consistency point, and the superblock is not corrupt, the filer 102 can assume that the writing of Superblocks A on all the volumes 502-504 of the group began, but may not necessarily have been completed. That is, the filer 102 can assume the filer at least began phase 2 before the crash.

Similarly, if, during recovery, Superblocks A and B on the root volume 500 are found to have been written as part of the most recent consistency point, and the superblocks are not corrupt, the filer 102 can assume that the writing of Superblocks A on all the volumes 502-504 of the group was completed before the crash or before an orderly system shutdown.

In other words, the filer 102 can assume the filer completed phase 3 before the crash or orderly system shutdown, because the filer 102 would not have written Superblock B on the root volume until it completed writing all the Superblocks A on the other volumes 502-504.

As noted, some clients require the group of volumes 502-504 to be consistent with each other. That is, when the group of volumes 502-504 is mounted, the consistency points used to mount the volumes must all have been taken at the same time. If the filer 102 crashed while taking the consistency points, some of the volumes 502-504 may have incomplete consistency points. An incomplete consistency point is evidenced by the two copies of the superblock of a volume being inconsistent with each other or one of the superblocks being corrupt. This inconsistency is indicated by the Consistency Point Number field 400 containing different values in the two superblocks (A and B) 328 of the volume. Corruption is indicated by the Checksum field 404 not matching a checksum calculation of the superblock 328.

If a volume 502-504 is self-consistent, i.e., the two superblocks (A and B) on the volume represent identical consistency points, the filer 102 simply mounts the volume. However, if a volume 502-504 is not self-inconsistent, the filer 102 chooses which superblock (A or B) to use to mount the volume, as discussed below.

More generally, during recovery, the filer 102 reads and analyzes the superblocks (A and B) on the root volume 500, and ascertains whether the individual superblocks are corrupt or not corrupt and which consistency point (i.e., the most recent consistency point or a previous consistency point) is represented by each of the superblocks. In other words, the filer uses the contents of the two superblocks (A and B) on the root volume as an indicator of the phase at the time of the crash. From this phase information, the filer can ascertain whether all the consistency points of the group of volumes were completed before the filer crashed. If all the consistency points were not completed, the filer uses the phase information and the states of the superblocks on the volumes of the group to ascertain whether sufficient reliable consistency point information exists on the volumes to mount the most recent consistency point, or an earlier group consistency point should be used.

Policy

Thus, based on analyzing the superblocks on the root volume, the filer 102 selects a "policy" regarding how to handle the other volumes 502-504, if the two superblocks on any one of the volumes 502-504 are not consistent with each other (i.e., the two superblocks represent different consistency points). The analysis performed by the filer 102 on the root volume 500 is summarized in Table 3 and is described in more detail below. In the columns labeled "Superblock A" and "Superblock B," the designation "CP-X" means a Consistency Point Number ("X") that represents a consistency point taken earlier than a consistency point represented by the designation "CP-Y." The Consistency Point Number is stored in the Consistency Point Number field 400 (FIG. 4). The rows of Table 3 represent all the possible combinations of two superblocks with identical or different Consistency Point Numbers, and all the possibilities of one or both superblocks being corrupt.

TABLE 3

| | Superblock A | Superblock B | Description | Policy |
|---|---|---|---|---|
| 1 | CP-X<br>CP-Y | CP-X<br>CP-Y | Volume is self-consistent; crash during Phase 4 or not during a consistency point | Rollforward: use latest valid superblock |
| 2 | CP-Y | CP-X | Crash during Phase 2 | Rollback: use older superblock |
| 3 | CP-X | CP-Y | Should never occur | Rollforward: use latest superblock |
| 4 | CP-any | Corrupt | Crash during Phase 3 | Rollforward (alternate) use latest valid superblock |
| 5 | Corrupt | CP-any | Crash during Phase 1 | Rollforward (alternate) use latest valid superblock |
| 6 | Corrupt | Corrupt | Fatal error | Not addressed by this system |

Root Volume Superblock Consistency Point Identifier Analysis

The fifth row of Table 3 represents a situation in which the filer 102 crashed during phase 1, i.e., while the filer was writing to Superblock A on the root volume 500. The corrupt Superblock A indicates that the write operation was not completed before the filer crashed. Under these circumstances, none of the superblocks on any of the volumes 502-504 of the group had been written, because phase 2 had not yet been started, and Superblocks A on the volumes 502-504 are written during phase 2. The superblocks on the volumes 502-504 still identify an earlier consistency point in their respective Consistency Point Number fields 400. Thus, the volumes 502-504 can be mounted using these consistency points.

An alternative explanation for the situation represented by this row of the table (i.e., a corrupted Superblock A) is Superblock A on the root volume 500 was spontaneously corrupted between consistency points, i.e., not while the superblock was being written as part of a consistency point. Such a spontaneous corruption can occur, for example, as a result of a hardware failure, contamination (such as dust) in a disk drive or a cosmic ray penetrating a magnetic domain on a disk platter. Under this alternative scenario, the superblocks on the volumes 502-504 identify the most recent consistency point.

In either case, all the volumes 502-504 should be consistent with each other, and these volumes can be mounted by referring to the consistency points identified in their superblocks. Consequently, if one of the two superblocks on any of the volumes 502-504 is corrupt, the other (non-corrupt) superblock should be used to mount the volume. Using the other (non-corrupt) superblock is acceptable, because the two superblocks should represent identical consistency points.

The second row of Table 3 represents a situation in which the filer 102 crashed during phase 2. In this case, the filer 102 synchronously wrote Superblock A on the root volume 500, as indicated by: (a) Superblock A containing CP-Y in the Consistency Point Number field 400 and (b) Superblock B containing the preceding Consistency Point Number (CP-X). The filer 102 may have begun writing Superblocks A on the volumes 502-504 of the group. The filer 102 may even have completed writing the Superblocks A on the volumes 502-504. The filer 102 had not, however, synchronously written Superblock B on the root volume 500 when the filer crashed, as indicated by Superblock B containing CP-X, i.e., an earlier Consistency Point Number than is in Superblock A. Thus, the filer 102 had not yet completed phase 2. Consequently, upon recovery, the filer 102 can not assume Superblocks A had been written on all the volumes 502-504 of the group. In this case, because all the Superblocks A on the volumes 502-504 are not guaranteed to have been written, all the volumes 502-504 should be mounted using their Superblocks B, i.e., rolled back using the older superblocks.

The fourth row of Table 3 represents a situation in which the filer 102 crashed during phase 3, i.e., while the filer 102 was synchronously writing Superblock B on the root volume 500, as indicated by Superblock B being corrupt. Because phase 3 had started, phase 2 must have completed, i.e. Superblocks A had been written on all the volumes 502-504 of the group. Thus, the volumes 502-504 are all consistent with each other and, upon recovery, the filer 102 can mount the volumes 502-504.

Alternative explanations for the situation represented by this row include hardware failure, contamination and cosmic rays. Regardless of the cause of the situation, one of the superblocks is corrupt. For this reason, the policy is "Rollforward (alternate)," to distinguish this policy from the policy ("Rollforward") represented by the first row of Table 3, in which neither of the superblocks of the root volume is corrupt. This distinction is significant if one of the superblocks of one of the volumes 502-504 is also corrupt, i.e., in case of a double error, as described in more detail below.

The first row of Table 3 represents a situation in which the filer 102 crashed during phase 4 or between consistency points. Under these circumstances, all the volumes 502-504 should be consistent with each other, because: (a) write operations to Superblocks A on all the volumes 502-504 were completed in phase 3 or (b) the superblocks were not being written to, because the crash occurred between consistency points. In the column labeled "Policy," the term "Rollforward" means mount the volume in a conventional manner, i.e. use the newest or latest consistency point on the volume to mount the volume.

The third row of table 3 represents a situation that should never occur, i.e., the Consistency Point Number (CP-X) in the first superblock (Superblock A) on the root volume 500 is smaller (indicating an earlier consistency point) than the Consistency Point Number (CP-Y) in the second superblock (Superblock B). This situation represents a logical inconsistency, because, during a consistency point, the filer 102 writes the same Consistency Point Number in both superblocks, and the filer writes to Superblock A before it writes to Superblock B. Thus, Superblock A should never contain a Consistency Point Number that is less than the Consistency Point Number in Superblock B. The other volumes 502-504 should be consistent with each other.

If both superblocks on the root volume 500 are corrupt, as indicated in the sixth row of Table 3, the root volume cannot be mounted, and the filer 102 issues a fatal error.

Volume Mounting According to the Policy

Figure 8:
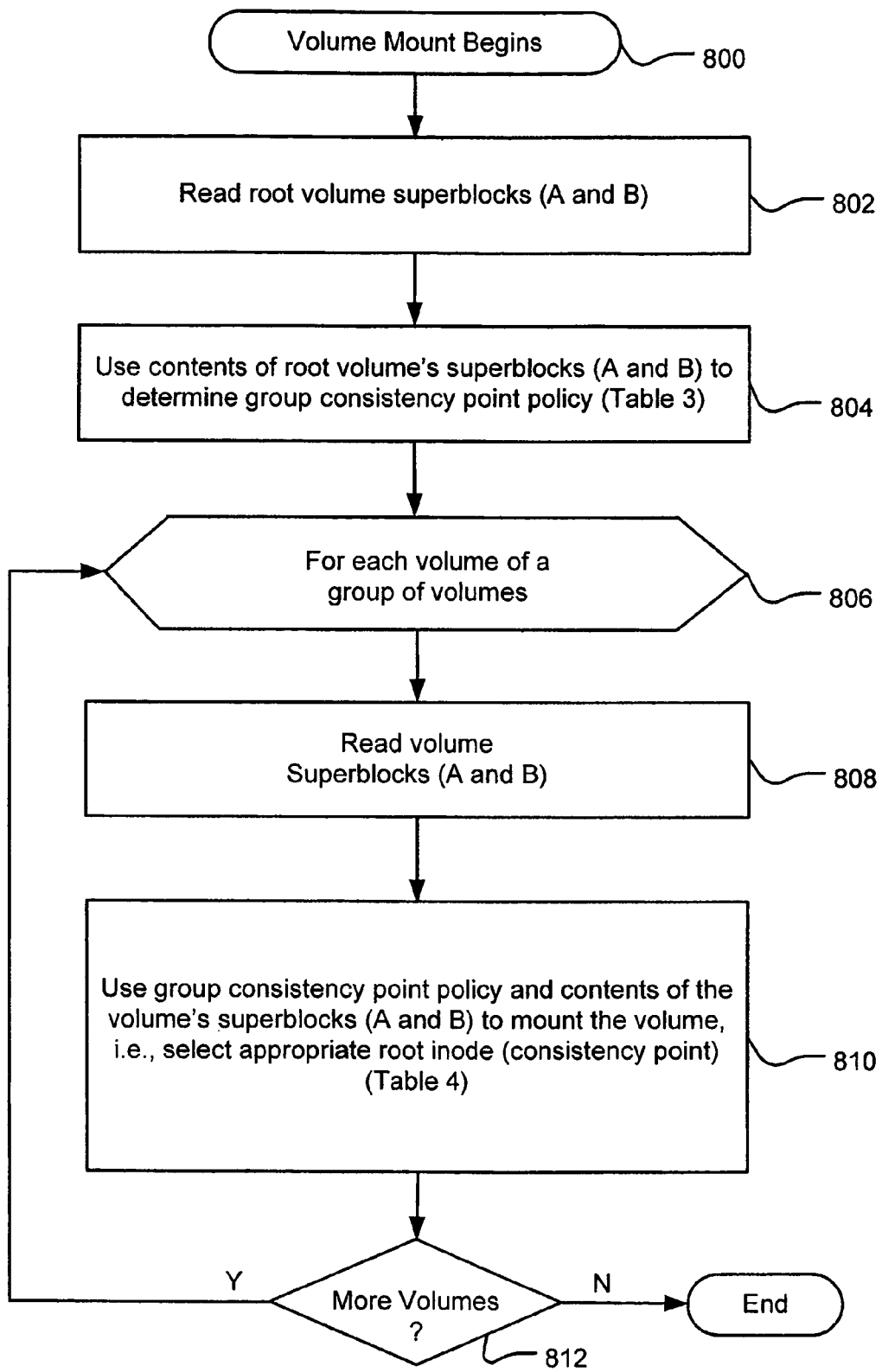
FIG. 8 is a flowchart illustrating operation of a filer to mount a group of volumes consistent with each other, in accordance with an embodiment of the present invention.

Once the policy is determined from the contents of the root volume 500, according to Table 3, the policy is used to mount the other volumes 502-504, each according to its state, as summarized in Table 4 and as described in detail below. FIG. 8 contains a flowchart that describes the volume mounting procedure. Volume mounting begins at 800. At 802, the filer 102 reads the root volume 500 superblocks. At 804, the filer 102 uses the root volume 500 superblocks and Table 3 to select a policy. The filer 102 then loops (806), processing each of the volumes 502-504 of the group of volumes. At 808, the filer 102 reads the two superblocks of the volume. At 810, the filer 102 uses the policy and the state of the volume 502-504 to take an appropriate action (per Table 4) to mount the volume. The filer loops back at 812 until all the volumes 502-504 are mounted. These operations will now be described in more detail.

Once the filer 102 determines a policy by analyzing the root volume's superblocks, the filer 102 mounts each of the other volumes 502-504 according to the policy. Actions taken by the filer 102 to mount each of the other volumes 502-504 depend on the policy and on the state of the other volume. For example, if the filer 102 crashed during phase and all the other volumes 502-504 are self-consistent (i.e., both superblocks on each volume 502-504 contain identical Consistency Point Numbers in their respective Consistency Point Number fields 400), the consistency points on all the volumes 502-504 were completed, even though the filer 102 may not have been able to write to Superblock B on the root volume 500 before the crash. Under these circumstances, the other volumes 502-504 are consistent with each other, and the volumes 502-504 can be mounted using either superblock thereon.

As noted, the action taken to mount each volume 502-504 is summarized in Table 4, based on the policy determined from the state of root volume superblocks A and B according to Table 3 and the state of the volumes 502-504. For each policy from Table 3, the possible conditions of the two superblocks (A and B) of a volume 502-504 are shown in Table 4, along with an action to be taken to mount the volume. The columns labeled "Superblock A" and "Superblock B" refer to the Consistency Point Number fields 400 in the volume 502-504, and CP-X refers to a consistency point taken earlier than CP-Y.

TABLE 4

|   | Policy | Superblock A | Superblock B | Action |
|---|---|---|---|---|
| 1 | Any | CP-X<br>CP-Y | CP-X<br>CP-Y | Use latest valid superblock; no crash occurred during a consistency point |
| 2 | Any | Corrupt | Corrupt | Not addressed by this system |
| 3 | Rollforward | CP-Y | CP-X | Use CP-Y |
| 4 | Rollforward | Corrupt | CP-X | Use CP-X, but with warning |
| 5 | Rollforward | CP-Y | Corrupt | Use CP-Y |
| 6 | Rollforward (alternate) | CP-Y | CP-X | Use CP-Y |
| 7 | Rollforward (alternate) | Corrupt | CP-X | Use CP-X, but with warning |
| 8 | Rollforward (alternate) | CP-X | Corrupt | Use CP-X, but with warning |
| 9 | Rollback | CP-Y | CP-X | Use CP-X |
| 10 | Rollback | Corrupt | CP-X | Use CP-X |
| 11 | Rollback | CP-X | Corrupt | Highly unlikely; use CP-X, but with warning |

Data Volume Superblock Consistency Point Identifier Analysis

According to the first row of Table 4, if the volume 502-504 is self-consistent, i.e., both superblocks (A and B) on the volume contain identical Consistency Point Numbers, regardless of the policy, the volume can be mounted conventionally, because no crash occurred during a consistency point.

The system does not address the situation indicated by the second row of Table 4, i.e., if both superblocks (A and B) on one or more of the volume 502-504 are corrupt. The volume with both corrupt superblocks does not contain sufficient information to mount the volume. Consequently, other methods may be necessary to recover information stored on the volume.

The third, fourth and fifth rows of Table 4 relate to the "Rollforward" policy. According to Table 3, if the crash occurred during Phase 4 or not during a consistency point (Table 3, Row 1) or if the crash occurred during Phase 1 (Table 3, Row 5), the policy is Rollforward.

If the crash occurred not during a consistency point or during Phase 1, neither superblock on the volume 502-504 was being written during the crash. If the crash occurred not during a consistency point, the filer 102 was not writing to either superblock during the crash, thus there was no opportunity for the volumes 502-504 to become inconsistent with each other. Similarly, if the crash occurred during Phase 1, the filer 102 had not yet begun writing the superblocks on the volumes 502-504, so there was no opportunity for the volumes 502-504 to become inconsistent with each other. Thus, in both cases, both superblocks should be valid (i.e., not corrupt), and the newest superblock (the one that references CP-Y) should be used to mount the volume.

If the crash occurred during Phase 4, all the Superblocks A on the volumes 502-504 had already been written (during Phase 2). Thus, all the volumes 502-504 should be consistent with each other, if their Superblocks A can be used to mount the volumes.

As indicated in the third row of Table 4, if the policy is Rollforward, and Superblock A of the volume 502-504 indicates a newer consistency point than is indicated in Superblock B, Superblock A and the newer consistency point are used to mount the volume.

The situation indicated by the fifth row of Table 4 is similar to the situation indicated by the third row, except Superblock B is corrupt. The Superblock B may have been corrupted because the filer 102 crashed while writing to the Superblock B during Phase 4. If the filer 102 crashed during Phase 1 or not during a consistency point, some other event caused the corruption of the Superblock B. In either case, the volume 502-504 can be mounted using Superblock A without creating an inconsistency with the other volumes 502-504, as discussed above with respect to the third row of Table 4.

The situation indicated by the fourth row of Table 4 should not occur. The Policy is Rollforward, thus the filer 102 either: (a) had not started writing to the Superblocks A on the volumes 502-504 (because the crash occurred during Phase 1); (b) had completed writing to the Superblocks A on the volumes 502-504 (because the crash occurred during Phase 4); or (c) was not writing to any superblocks (because the crash occurred not during a consistency point). Consequently, there was no opportunity for Superblock A on the volume 502-504 to become corrupt as a result of the crash. Some other event, such as a hardware failure or contamination, caused the corruption.

The volume 502-504 can be mounted using the only available superblock, i.e., Superblock B. However, the system has no way to verify that mounting the volume with this superblock will make the volume consistent with the other volumes 502-504. That is, the corrupted superblock (A) likely contained a higher Consistency Point Number than the Consistency Point Number (CP-X) that Superblock B contains. The system mounts the volume 502-504 and issues a warning that the volume may be inconsistent with the other volumes 502-504.

The sixth, seventh and eighth rows of Table 4 represent situations in which the policy is "Rollforward (alternate)." Essentially, the filer 102 executes a state machine to mount the volumes 502-504, where the states are controlled by Tables 3 and 4 and the contents of the superblocks on the root volume 500 and the other volumes 502-504. The "Rollforward" and the "Rollforward (alternate)" policies allow the state machine to differentiate between single-error situations and double-error situations. The Rollforward policy is used when no error (corruption) is detected on the root volume 500, but it is possible that a superblock on one of the other volumes 502-504 is corrupt, i.e., a single-error situation. In contrast, the Rollforward (alternate) policy is used when one error (corruption) is detected on the root volume 500, and a second error (corruption) might yet be detected on the other volume 502-504, i.e., a double-error situation. In other words, the Rollforward (alternate) policy informs the state machine that a first error has been detected, and that the state machine should treat a corrupt superblock on one of the other volumes 502-504 (i.e., a second error) differently than if the corrupt superblock on the other volume 502-504 were the only error.

The sixth, seventh and eighth rows of Table 4 represent situations with a policy of "Rollforward (alternate)," resulting from a determination that Superblock B on the root volume is corrupt, i.e., one error has been detected so far. As indicated in Table 3, this situation can occur if the filer 102 crashes during Phase 3, i.e., after all the Superblocks A have been written on the volumes 502-504. As shown in Table 2, the Superblocks B on the volumes 502-504 have not yet been written by the end of Phase 3, thus the two superblocks (A and B) on the volumes 502-504 represent different consistency points. The policy "Rollforward (alternate)" indicates that the newer consistency point on each volume 502-504 should be used to mount the volume.

As previously noted, a corrupt Superblock B on the root volume 500 can also be explained by a hardware failure or some other event unrelated to a crash or a consistency point. In these situations, the superblocks on the other volumes 502-504 should be examined to confirm consistency points. These situations are handled according to the first, sixth, seventh and eighth rows of Table 4, where Superblocks A and B may contain identical, different or corrupt Consistency Point Numbers.

As indicated in the sixth row of Table 4, if Superblock A of the volume 502-504 represents a newer consistency point than Superblock B, the newer consistency point (CP-Y) should be used to mount the volume. If the filer 102 crashes during Phase 3, it is expected that Superblock A represents a newer consistency point (CP-Y) than is represented in Superblock B (CP-X), because, as discussed above, the crash occurred after all the Superblocks A were written, but before any of the Superblocks B were written.

However, as indicated in the seventh and eight rows of Table 4, if the policy is Rollforward (alternate), i.e., a first error has been detected and one of the superblocks of another volume 502-504 is corrupt, the system cannot ascertain whether the corrupt superblock represented a newer consistency point than is represented by the non-corrupt superblock. In these cases, the only non-corrupt superblock is used to mount the volume, but a message is issued warning that the mounted volume may not be consistent with the other volumes 502-504.

Rows nine, ten and eleven of Table 4 are used if the policy is "Rollback." If the filer 102 crashed during Phase 2, the filer 102 wrote Superblock A on the root volume 500, and the filer 102 may have written some of the Superblocks A on the other volumes 502-504. However, as indicated by the fact that Superblock B on the root volume 500 had not yet been written, the filer 102 had not completed Phase 3. Thus, it is not certain how many (if any) of the Superblocks A on the other volumes 502-504 the filer 102 completed writing before the crash. Consequently, the Superblocks A on the other volumes 502-504 may not be consistent with each other, and the Superblocks A on the other volumes 502-504 should not be used to mount the other volumes. Instead, the other volumes 502-504 should be "rolled back" to a previous consistency point. Thus, the policy is "Rollback," as indicated in Table 3 (row 2).

The filer 102 had not yet started writing the Superblocks B on the other volumes 502-504. Thus, the Superblocks B on the other volumes 502-504 should still reference the previous consistency point (CP-X). These superblocks (B) can be used to mount the other volumes 502-504, and the mounted volumes should be consistent with each other. The Rollback policy directs the filer 102 to use the older consistency point.

As indicated by the ninth row of Table 4, if neither superblock (A nor B) is corrupt on the other volumes 502-504, the two superblocks are expected to identify different consistency points, because the two superblocks (A and B) were written during different consistency points, as discussed above. The Rollback policy directs the filer 102 to use Superblock B, which references the older consistency point, to mount the volume 502-504.

As indicated by the tenth row of Table 4, if the Superblock A on one of the other volumes 502-504 is corrupt, the Superblock B of the volume can still be used to mount the volume, without loss of generality.

As indicated by the eleventh row of Table 4, it is unlikely that the Superblock B on one of the other volumes 502-504 will be corrupt, at least due to the crash, because the Superblock B was not being written at the time of the crash. The Superblock B may have been corrupted by another event, unrelated to the consistency point, as discussed above. In any case, the volume can be mounted using the Superblock A, however a message is issued warning that the mounted volume is not likely to be consistent with the other volumes 502-504.

Filer Cluster Group Consistency Points

Figure 9:
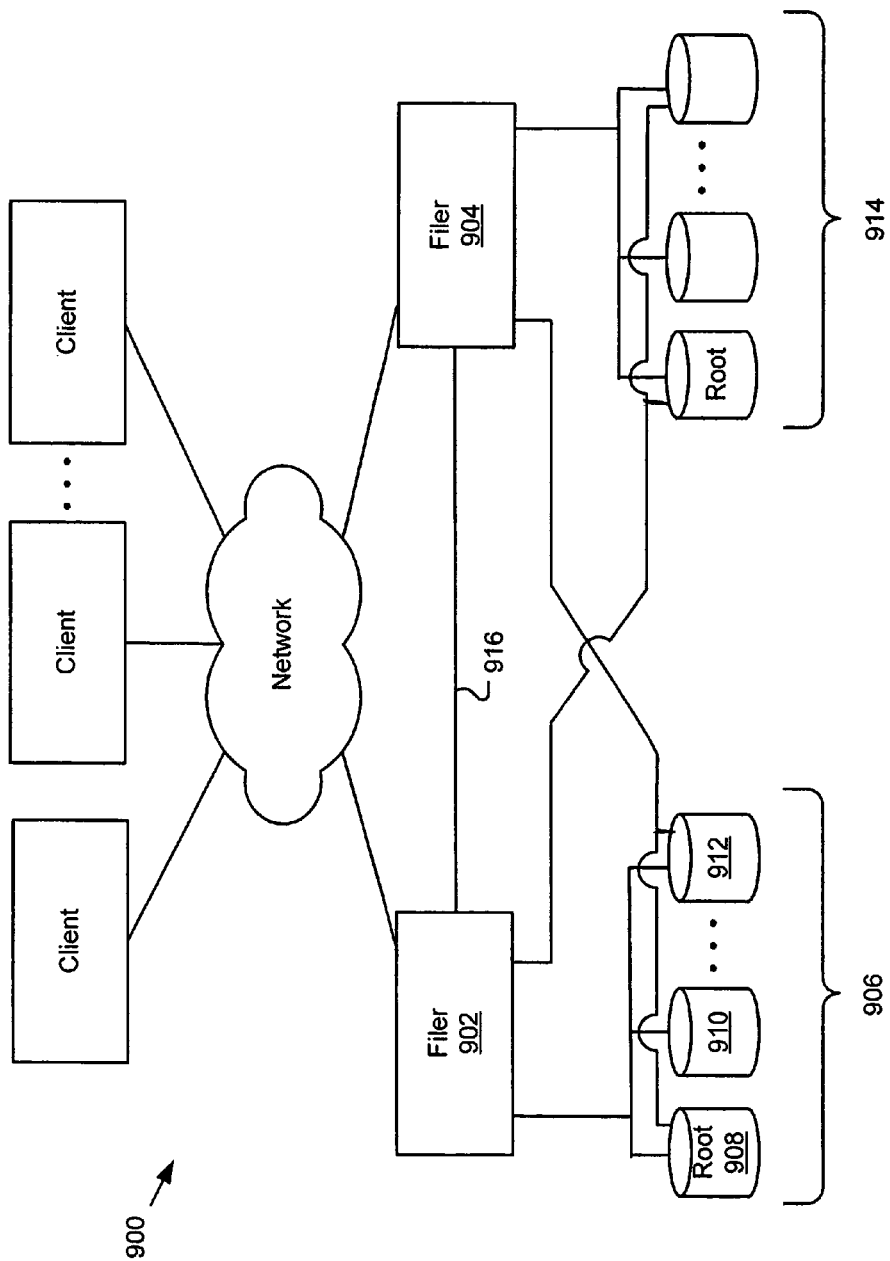
FIG. 9 is a block diagram of a prior art cluster file storage system.

The description provided above applies to a single filer; however, the protocol and procedures can be extended to apply to a cluster of filers. FIG. 9 is a block diagram of a network storage system 900 that includes a cluster of filers 902 and 904. Each filer 902 and 904 is connected to a local set of volumes and to the other filer's set of volumes. For example, the filer 902 is connected to a local set of volumes 906, including a local root volume 908 and other volumes 910 to 912. These connections can utilize dual-fiber FDDI or other technologies, as described above. Similarly, the other filer 904 is connected to a local set of volumes 914. The two filers 902 and 904 are interconnected by a network link 916, such as a Fibre Channel or InfiniBand link, to synchronize activities, such as consistency points. If one of the filers 902 or 904 fails, the other filer takes over control of the failed filer's volumes 906 or 914. Clustered filers are available from Network Appliance, Inc., Sunnyvale, Calif. under the trade name MetroCluster.

During normal operations, each of the filers 902 and 904 operates as described above. However, during take-over of a failed ("partner") filer, the surviving filer 902 or 904 operates according to an extended four-phase protocol, as summarized in Table 5. For example, assume filer 904 fails. Phase 1 and phase 3 are similar to the corresponding phases described above, however, each of these phases is divided into two sub-phases. In the first sub-phase, the surviving filer 902 writes to a superblock on its local root volume 908, and in the second sub-phase, the filer writes to a superblock on the taken-over root volume. During phases 2 and 4, the surviving filer 902 writes to its local volumes 906 and to the taken-over volumes 914.

TABLE 5

| Phase | Action |
|---|---|
| 1a | Synchronously write Superblock A on the local root volume |
| 1b | Synchronously write Superblock A on the partner root volume |
| 2 | Write Superblocks A on all volumes of the group |
| 3a | Synchronously write Superblock B on the local root volume |
| 3b | Synchronously write Superblock B on the partner root volume |
| 4 | Write Superblocks B on all volumes of the group |

When partner takeover occurs, the partner group consistency point policy is applied independently of the current local policy. That is, the filer ("survivor") that has taken over a partner's volumes operates its local volumes according to its own policy, in case of a local failure. In addition, the survivor operates the taken over volumes according to the partner group consistency point policy. This is done by maintaining parallel local and partner group consistency point information. As with local boot, the partner's root volume is mounted first (before the partner's other volumes), and the appropriate group consistency point policy is determined. As subsequent partner volumes are mounted, the appropriate policy is applied.

The disclosed system and method are applicable to all types of data container systems, regardless of the actual configuration of the storage system. For example, the coordination of consistency points among groups of volumes may be applied in a storage area network (SAN). In such a SAN configuration, network block level I/O may be used with sequentially coordinated consistency points to achieve the disclosed system and method. The disclosed system and method may also be applied in a network attached storage (NAS) to achieve coordinated consistency points for consistent file system restoration. With a NAS system, consistency points can be sequentially coordinated on a network with file-based access. With SAN, NAS or other data container system configurations, the storage devices may be local or remote, and operated with file-based protocols such as NFS or CIFS. In addition, remote network storage configurations can be connected through a "cloud" of a network connection, as is often the case with internet connected storage systems.

The disclosed system and method for permitting the restoration of a file system with coordinated, consistent volumes is applicable to systems beyond those associated with traditional concepts of a file system. For example, while benefits may be realized for operating systems that are substantially based on file storage, applications including databases, data collection, or any other logical organization of data can benefit from the disclosed system and method.

A system and method for maintaining consistency of consistency points among a group of volumes has been described as including a processor controlled by instructions stored in a memory. Those skilled in the art should readily appreciate that instructions or programs defining the functions of the present invention can be delivered to a processor in many forms, including, but not limited to, information permanently stored on non-writable storage media (e.g. read-only memory devices within a computer, such as a ROM, or removable read-only devices, such as a CD-ROM or DVD disk readable by a computer I/O attachment), information alterably stored on writable storage media (e.g. RAM, flash memory, floppy disks, CD-RW, DVD-R or hard drives) or information conveyed to a computer through communication media. In addition, while the invention may be embodied in software, the functions necessary to implement the invention may alternatively be embodied in part or in whole using firmware and/or hardware components, such as Application Specific Integrated Circuits (ASICs), Field-Programmable Gate Arrays (FPGAs), combinatorial digital logic or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Furthermore, combinations and subcombinations of the disclosed embodiments and features are possible. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method for restoring a file system having a plurality of volumes with a plurality of superblocks associated with each volume, the method comprising:
    writing, by a storage server, having a processor and a memory, the superblocks to the volumes is in predetermined sequence, wherein a current volume consistency point is established for a volume when the superblocks associated with the volume have been written completely to the volume;
    determining, during restoration of the file system, whether a current volume consistency point for each of the plurality of volumes was established;
    selecting the current volume consistency point for each of the plurality of volumes if a current volume consistency point was established for each of the plurality of volumes;
    selecting a previous volume consistency point for each of the plurality of volumes if a current volume consistency point was not established for each of the plurality of volumes; and
    mounting the volumes based on the selected volume consistency point.

2. The method according to claim 1, further comprising writing a sequence progression indicator to each superblock written in the predetermined sequence.

3. The method of claim 2, wherein the determining further includes ascertaining the value of the sequence progression indicator.

4. The method according to claim 1, further comprising providing a data structure identifier for each superblock to contribute to establishing the predetermined sequence.

5. The method according to claim 1, wherein one volume is a root volume.

6. The method according to claim 5, wherein the superblocks on the root volume are root superblocks.

7. The method according to claim 6, wherein writing the superblocks further comprises alternately writing one of the root superblocks on the root volume and one of the superblocks on each one of all other volumes.

8. A method for restoring a file system having a plurality of volumes, each volume having a plurality of superblocks, comprising:
    sequentially writing, by a storage server having a processor and a memory, the superblocks to each of the plurality of volumes to establish a volume consistency point for each of the plurality of volumes;
    upon conducting a file system restoration operation, determining where an interruption occurred in the sequential writing of superblocks; and
    determining whether a current volume consistency point for each of the plurality of volumes was established based on the determination of where the interruption occurred;
    selecting the current volume consistency point from each of the plurality of volumes to restore each of the plurality of volumes if a current volume consistency point was established for each of the plurality of volumes; and
    selecting a previous volume consistency point for each of the plurality of volumes if a current volume consistency point was not established for each of the plurality of volumes.

9. A system for restoring a file system having a plurality of volumes with a plurality of superblocks associated with each volume, the system comprising;
    one or more storage devices for supporting implementation of the volumes; and a file system coupled to the storage devices for implementing the volumes, the controller being operable to:
    write the superblocks to the volumes in a predetermined sequence to establish a current volume consistency point for each of the plurality of volumes;
    determine, during restoration of the file system, whether a current volume consistency point for each of the plurality of volumes was established;
    select the current volume consistency point for each of the plurality of volumes if a current volume consistency was established for each of the plurality or volumes;
    select a previous volume consistency point for each of the plurality of volumes if a current volume consistency point was not established for each of the plurality of volumes; and
    mount the volumes based on the selected volume consistency point.

10. The system according to claim 9, wherein the controller is further operable to write a sequence progression indicator to each superblock written in the predetermined sequence.

11. The system according to claim 9, wherein the controller is further operable to provide a superblock identifier for each superblock.

12. The system according to claim 9, wherein one volume is a root volume.

13. The system according to claim 12, wherein the superblocks on the root volume are root superblocks.

14. The system according to claim 13, wherein the predetermined sequence further comprises alternately writing one of the root superblocks on the root volume and one of the superblocks on each one of all other volumes.

15. A method for obtaining a consistent set of superblocks for mounting a plurality of volumes during a file system restoration operation, each volume having a plurality of the superblocks that support restoration of each volume, the method comprising:
    writing, by n storage server having a processor and a memory, a first superblock to each of the volumes;

writing a second superblock to each of the volumes;

determine whether all the second superblocks have been written;

selecting all the second superblocks for use in restoring the volumes during the restoration operation if all the second superblocks have been written; and selecting all the first superblocks for use in restoring the volumes during the restoration operation if all the second superblocks have not been written.

16. The method according to claim 15, further comprising writing the first superblock to a root volume before writing the first superblock to other volumes.

17. The method according to claim 16, further comprising writing the second superblock to a root volume before writing the second superblock to other volumes.

18. The method according to claim 17, further comprising providing a sequence indicator to indicate a most recently written superblock.

19. The method according to claim 18, further comprising changing the sequence indicator after writing all of the first superblocks and after writing all of the second superblocks.

20. The method according to claim 19, further comprising determining a policy for selecting all the first superblocks or all the second superblocks based on the comparing the sequence indicators for the first and second superblocks from the root volume.

21. A system for storing a file system having a plurality of volumes and a plurality of superblocks for each volume, the system comprising:

storage means for supporting implementation of the volumes;

control means coupled to the storage means for implementing the volumes on the storage means, the control means being operable to:

write the superblocks to the volumes in a predetermined sequence;

determine a progression of the sequence in conjunction with operations for restoration of the file system;

select a first plurality of superblocks associated with each volume to contribute to restoration of each volume if the determination of the progression of the sequence indicates that a current consistent point was established for each of the plurality of volumes;

select a second plurality of superblocks associated with each volume to contribute to restoration of each volume of the determination of the progression of the sequence indicates that a current volume consistency point was not established for each of the plurality of volumes; and mount the volumes based on the selected superblocks.

* * * * *